United States Patent [19]
Winter et al.

[11] 3,755,322
[45] Aug. 28, 1973

[54] DIAMINO-S-TRIAZINES

[75] Inventors: Roland Winter, Armonk; Raymond Seltzer, New York, both of N.Y.

[73] Assignee: Ciba-Geigy Corporation, Greenburgh, N.Y.

[22] Filed: July 15, 1970

[21] Appl. No.: 55,240

[52] U.S. Cl......... 260/249.6, 260/249.8, 260/249.9, 260/78 R, 260/830 R
[51] Int. Cl............................................. C07d 55/20
[58] Field of Search...................... 260/249.8, 249.9, 260/249.6

[56] References Cited
UNITED STATES PATENTS
3,563,988  2/1971  Feichtinger et al.............. 260/249.9
3,637,685  1/1972  D'Alelio.......................... 260/249.6
3,310,557  3/1967  Kleemann..................... 260/249.8 X

OTHER PUBLICATIONS

Theilheimer, "Synthetic Methods of Organic Chemistry," Vol. 12, Pub., S. Karger, New York (1958), p. 21.

*Primary Examiner*—John M. Ford
*Attorney*—Karl F. Jorda, Nestor W. Shust and Bruce M. Collins

[57] ABSTRACT

The disclosure covers diamino-s-triazines which are useful in polymer synthesis, such as polyimides. Also covered are dinitro-s-triazines which can be used as intermediates for the diamino compounds. The diamines are prepared by a condensation of 2-substituted-4,6-dichlorotriazines with diamines or with nitroamines. The product from the latter reaction can be reduced subsequently to diamines.

19 Claims, No Drawings

DIAMINO-S-TRIAZINES

DETAILED DISCLOSURE

The diamino-s-triazines of this invention are represented by the general formula

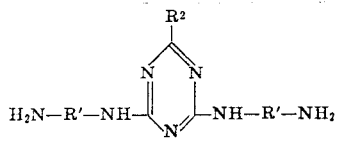

wherein
- R' is alkylene, cycloalkylene, arylene, alkarylene, aralkylene, or diarylene ether, diarylene thioether, diarylene methane or diarylene sulfone group and a heterocyclic group.
- $R^2$ is hydrogen, alkyl, cycloalkyl, amino, arylamino, alkyl amino, pyrrolidino, piperidino, phenyl, halo, hydroxyl or carboxyl group.

These amino-s-triazine compounds can be used generally for the same applications as other organic diamines. For example, they can be used in making various polymers, such a polyimides, polyamides and polyureas. They are also useful in other areas, as dyestuff intermediates or as hardeners for epoxy resins.

The (lower) alkyl group employed herein means a straight, or branched chain alkyl group having up to four carbon atoms. Examples of such groups are methyl, ethyl, propyl, isopropyl, butyl and the like.

The alkyl groups mentioned above in reference to R' and $R^2$ have up to eight carbon atoms, that is, methyl, ethyl, propyl, isopropyl, butyl, tert-butyl, hexyl, octyl and its isomers. Cycloalkyl groups have from three to six carbon atoms, such as cyclopropyl, cyclobutyl, cyclopentyl and cyclohexyl. The aryl, alkaryl and aralkyl groups have up to about 14 carbon atoms, such as phenyl, biphenyl, tolyl, naphthyl, anthracyl, ethylnaphthyl, benzyl, 1-phenylhexyl, 1-phenylethyl, 3,5-diethylphenyl and the like. The heterocyclic group in R' can be derived from a furan, a thiophene or a pyridine.

The R' group in the above general structure is more specifically selected from the following groups:
a. ortho, meta and para phenylene, biphenylene, naphthyl, anthracyl
b.

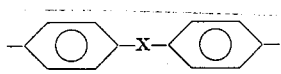

wherein X is sulfur, oxygen, sulfone, methylene groups
c. cycloalkylene groups, such as cyclopentylene, cyclohexylene and the like.

For the purposes of preparing high temperature polymers such as polyimides, R' is preferably aromatic divalent group such as a phenylene, a biphenylene or divalent radicals derived from diphenyl ether or diphenyl methane.

The blocking group $R^2$ mentioned above can be hydrogen, phenyl, substituted phenyl or an amino group illustrated below:

—$NH_2$, lower dialkylamino groups such as, dimethylamino, diethylamino, dipropylamine, diisopropylamino, dibutylamino and the like, pyrrolidino, piperidino, arylamino groups such as monoarylamino, e.g., anilino, diarylamino, e.g., diphenylamino and naphthylanilino; and N-(lower) alkyl anilino, e.g., N-methyl anilino, N-ethyl anilino, N-butyl anilino and the like.

The substituents on the phenyl group can be nitro, halo, especially chloro or bromo, carboxyl, cyano, alkyl, especially methyl, ethyl, propyl and butyl, hydroxy or aryl groups. Preferably $R^2$ is phenyl or a diarylamino group.

Following are illustrate examples of the diamino-s-triazine compounds of this invention.

2-Phenyl-4,6-bis(4'-aminoanilino)-s-triazine
2-Phenyl-4,6-bis(3'-aminoanilino)-s-triazine
2-Anilino-4,6-bis(4'-aminoanilino)s-triazine
2-N-Methylanilino-4,6-bis(3'-aminoanilino)-s-triazine
2-Dimethylamino-4,6-bis(3'-aminoanilino)-s-triazine
2-Dibutylamino-4,6-bis(3'-aminopropylamino)-s-triazine
2-Diphenylamino-4,6-bis(2'-aminoanilino)-s-triazine
2-Diphenylamino-4,6-bis(3'-aminoanilino)-s-triazine
2-Diphenylamino-4,6-bis(4'-aminoanilino)-s-triazine
2-Methyl-4,6-bis(8'-aminooctylamino)-s-triazine
2-n-Octyl-4,6-bis(4'-aminobutylamino)-s-triazine
2-Isopropyl-4,6-bis(4'-aminobutylamino)-s-triazine
2-Phenyl-4,6-bis(2'=methyl-4'-aminoanilino)-s-triazine
2-Diphenylamino-4,6-bis(3'-aminocyclohexylamino)-s-triazine
2-Phenyl-4,6-bis(aminocyclopropylamino)-s-triazine
2-Phenyl-4,6-bis(3'-aminopyridinylamino-5')-s-triazine
2-Piperidino-4,6-bis(3'-aminoanilino)-s-triazine
2,4-Bis(3'-aminoanilino)-s-triazine
2-Cyclohexyl-4,6-bis(3'-aminoanilino)-s-triazine
2-Amino-4,6-bis(3'aminoanilino)-s-triazine
2-Diphenylamino-4,6-bis[4'-(4''-aminophenoxyanilino)]-s-triazine
2-Diphenylamino-4,6-bis[4'-(4''-aminobenzyl)anilino]-s-triazine
2,4-(3'-Aminoanilino)-s-triazine The amino-s-triazine compounds of this invention can be prepared by various methods. One method comprises reacting a 2-aryl, alkyl, or amino substituted-4,6-dichloro-s-triazine with a large excess of a diamine. The reaction is generally conducted in solvents selected from tetrahydrofuran, acetone, methylethyl ketone, methyl-ethyl ketone-water, dioxane and dimethylformamide between 50°C – 100°C. It may be advantageous to conduct the reaction in the presence of acid acceptors such as sodium carbonate or sodium hydroxide. In reactions including 2-diphenylamino-4,6-dichloro-s-triazine and meta or para phenylenediamine, it is especially advantageous to conduct the reaction in dioxane. The product is obtained as a dioxane complex which can be readily isolated and purified.

Another method for preparing these compounds comprises reacting 1 mole of 2-substituted-4,6-dichloro-s-triazine with 2 moles of a nitroamino compound. The resulting intermediate dinitro compound is reduced to the desired diamino-s-triazine with a standard reducing agent such as stannous chloride and hydrochloric acid. This method is described by Ashley et al, J. Chem. Soc., 4525(1960).

A still further method useful in preparing the diamino-s-triazines having hydrogen in the 2-position (blocking group) comprises reacting one mole of cyanuric chloride with 2-moles of a nitroamine (e.g., m-nitroaniline) at 0°–50°C in the presence of an acid acceptor. The resulting intermediate 2-chloro-4,6-bis-nitroamino-s-triazine, is reduced chemically (iron and aqueous hydrochloric acid) or catalytically (hydrogen with a palladium or charcoal catalyst) to give the desired 2,4-bis-diamino compound.

In the above described one-step reaction where a diamino compound is reacted with a dichloro triazine, an undesirable side reaction between the diamine and two different triazine molecules is likely to occur. To minimize the formation of undesirable products which contain more than one triazine nucleus, it is advantageous to use an excess of the diamine, to carry out the condensation reaction at elevated temperatures, preferably between 50°C and 100°C or higher, depending on the reactants and the solvent employed and to add the dichloro-s-triazine slowly to the diamine.

When the above precautions are observed, the reation will favor the formation of the desired products over the undesired ones.

A further embodiment of the invention are the dinitro-s-triazine compounds which are prepared by one of the above mentioned methods and which are intermediates in the preparation of the diamino-s-triazine compounds discussed above. These dinitro-s-triazines can be represented by the following general structure:

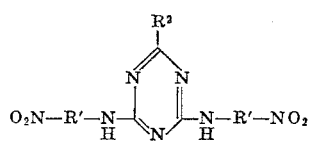

wherein R' is a divalent aromatic group exemplified above and R² is as defined above in connection with the diamino compounds.

Illustrative examples of the dinitro-s-triazine compounds are listed below:

2-Phenyl-4,6-bis(4'-nitroanilino)-s-triazine
2-Phenyl-4,6-bis(3'-nitroanilino)-s-triazine
2-Anilino-4,6-bis(4'-nitroanilino)-s-triazine
2-N-Metylanilino-4,6-bis(3'-nitroanilino)-s-triazine
2-Dimethylamino-4,6-bis(3'-nitroanilino)-s-triazine
2-Diphenylamino-4,6-bis(3'-nitroanilino)-s-triazine
2-Isopropyl-4,6-bis(4'-nitrobenzyl)-s-triazine
2-Phenyl-4,6-bis(2'-methyl-4'-nitroanilino)-s-triazine
2-Piperidino-4,6-bis(3'-nitroanilino)-s-triazine
2,4-Bis(3'-nitroanilino)-s-triazine
2-Cyclohexyl-4,6-bis(3'-nitroanilino)-s-triazine
2-Amino-4,6-bis(3'-nitroanilino)-s-triazine
2-Diphenylamino-4,6-bis[4'(4''-nitrophenoxy)anilino]-s-triazine
2-Diphenylamino-4,6-bis[4'-(4''-nitrobenzyl)anilino]-s-triazine
2,4(m-nitroanilino)-s-triazine
2-Hydroxy-4,6-bis(3'-nitroanilino)-s-triazine
2-Carboxy-4,5-bis(3'-nitroanilino)-s-triazine
2-Chloro-4,6-bis(3'-nitroanilino)-s-triazine The above described methods of preparing the dinitro-s-triazines and the diamino-s-triazines of this invention are further illustrated in the examples below.

EXAMPLE 1

2-Diphenylamino-4,6-Bis-(3'-Aminoanilino)-s-Triazine

Dioxane Complex

To a solution of 432.0g(4.0 mole) of m-phenylenediamine in 600 ml. of dioxane was added 84.8g(0.80 mole) of sodium carbonate. This mixture was heated to reflux, and while stirring in a nitrogen atmosphere, a solution of 126.8g(0.40 mole) of 2-diphenylamino-4,6-dichloro-s-triazine in 800 ml of dioxane was added dropwise over a 5.75 hour period. After the addition was complete, the reaction was stirred and refluxed overnight. After cooling, the reaction mixture was poured into 2 liters of ice water with stirring. The resulting solid was filtered, washed chloride free with water and then dried to give 181.0g of material. This crude product was stirred and refluxed in 1800 ml. of acetone for 30 minutes and filtered. The residue was discarded.

The acetone was stripped from the filtrate to give 158.7g of solid, m.p. 107–30. This material was added to 800 ml. of benzene and brought to boiling; 350 ml. of dioxane was added to obtain solution followed by 20g of charcoal. The mixture was filtered and upon cooling 102.79g(51 percent) of the product having the m.p. of 138°–142°C was obtained. The yield and the analysis is based on the dioxane complex.

Calculated for
$C_{31}H_{32}N_8O_2$: C, 67.86; H, 5.88; N, 20.42
Found: C, 67.67; H, 5.93; N, 20.32.

EXAMPLE 2

2-Diphenylamino-4,6-Bis(3'-Aminoanilino)-s-Triazine

To a solution of 108.0g(1.0mole) of m-phenylenediamine in 250ml of water was added a few drops of a phenolphthalein solution. While stirring this solution at reflux, solutions of 31.7g(0.10 mole) of 2-diphenylamino-4,6-dichloro-s-triazine in 300 ml of methyl ethyl ketone and 8.0g(0.20 mole) of sodium hydroxide in 72ml of water were added dropwise and simultaneously at such a rate as to keep the pH below 8. After the addition was complete, the reaction mixture was refluxed for 2 hours, the methyl ethyl ketone, was then removed by distillation. The reaction mixture was cooled and filtered. The residue was washed with water until chloride free and dried to give 48.4g of the crude product.

The crude was heated in 450ml of boiling acetone and filtered, and the filtrate stripped to dryness leaving 39.3g of solid. This material was recrystallized from hot isopropanol yielding 20.7g of 2-diphenylamino-4,6-bis(3'-aminoanilino)s-triazine having a m.p. of 188°–191°C.

Calculated for
$C_{27}H_{24}N_6$: C, 70.41; H, 5.25; N, 24.33
Found: C, 70.08; H, 5.11; H, 24.45

EXAMPLE 3

2-Dimethylamino-4,6-Bis-(3'Aminoanilino)-s-Triazine

To a solution of 540.5g(5.0 moles) of m-phenylenediamine in 2,500ml of water and 100ml of methyl ethyl ketone, at reflux and uneer nitrogen, was added dropwise a solution of 96.5g (0.50 mole) of 2-dimethylamino-4,6-dichloro-s-triazine in 500ml of methyl ethyl ketone. During this addition the pH was maintained between 8 and 10 by the simultaneous addition of 50 percent aqueous sodium hydroxide solution. After the additions were complete, the reaction mixture was stirred at reflux for 5 hours, and then the methyl ethyl ketone was distilled off at a reduced pressure. The reaction mixture was filtered and the residue washed with methanol and then twice thoroughly saturated with 1,000ml of methanol in an electric blender and filtered. The residue was washed with methanol and dried to give 127.0(76 percent) of the product, m.p. 197°–199°C. Recrystallization from ethanol gave a m.p. of 197°–200°C.
Calculated for
  $C_{17}H_{20}N_8$: C, 60.69; H, 5.99; N, 33.31
  Found: C, 60.80; H, 6.04; N, 33.25.

EXAMPLE 4

2,4-Bis-(3'-Aminoanilino)-s-Triazine

To a solution of 15.48g(0.04mole) of 2-chloro-4,6-bis(-m-nitroanilino-s-triazine, prepared from cyanuric and m-nitroaniline, in 200ml of tetrahydrofuran was added 4.04g(0.04mole) of triethylamine and 10g of 5 percent palladium on charcoal. The mixture was placed in Parr shaker at 50 psi pressure, and shaken overnight at room temperature. The reaction was then filtered and the residue washed with 400ml of tetrahydrofuran and with water until chloride free. The residue was then washed with dimethylformamide (DMF) until the filtrate was colorless. The DMF solution was then added to one liter of water. The resulting solid was filtered, washed with water and then stirred in 200 ml. of boiling acetone for 15 minutes. The product was filtered and dried under vacuum at 50°. The yield of 2,4-bis-(3'-aminoanilino)-s-triazine was 8.20(70 percent) m.p. 269–71°.
Calculated for
  $C_{15}H_{17}N_7$: C, 61.40; H, 5.16; N, 33.44
  Found: C, 61.16; H, 5.17; N, 33.24

EXAMPLE 5

2-Amino-4,6-Bis(3'-Aminoanilino)-s-Triazine

To a solution of 108.0g(1.0mole) of m-phenylenediamine in 200 ml of dioxane was added 21.2g(0.20mole) of sodium carbonate. While stirring this mixture at reflux under nitrogen, a solution of 16.5g(0.10mole) of 2-amino-4,6-dichloro-s-triazine in 250ml of dioxane was added dropwise over a 4.5 hour period. The reaction mixture was refluxed for an additional 6 hours, and then cooled to room temperature. The reaction mixture was poured into 2 liters of ice water. A gummy material formed which was removed, triturated with water and filtered. On standing 18.8g of solid crystallized from the filtrate. This material was recrystallized from isopropanol yielding 10.40g.(34 percent) of 2-amino-4,6-bis-(3'-aminoanilino)-s-triazine having a m.p. of 198°–200°C.
Calculated for
  $C_{15}H_{16}N_8$: C, 58.44; H, 5.19; N, 36.36
  Found: C, 58.72; H, 5.35; N, 36.30

EXAMPLE 6

2-Phenyl-4,6-Bis(3'Aminoanilino)-s-Triazine

To a solution of 86.0g(0.80mole) of m-phenylenediamine in 300ml of dioxane was added 25.0g(0.23mole) of sodium carbonate. The mixture was heated to reflux, and a solution of 18.0(0.08mole) of 2-phenyl-4,6-dichloro-s-triazine in 250ml of dioxane was added dropwise. After the addition was complete, the reaction mixture was refluxed for 15 hours, cooled and then poured into 3 liters of ice-water. The mixture was filtered, and the residue was washed free of chloride with water and dried.
Yield-30.0g.

The crude was recrystallized from isopropanol to yield 16.5g(56 percent) of 2-phenyl-4,6-bis(3'-aminoanilino)-s-triazine which decomposed at 178°C.
Calculated for
  $C_{21}H_{19}N_7$: C, 68.29; H, 5.18; N, 26.55
  Found: C, 68.24; N, 5.38; N, 26.27

EXAMPLE 7

2-Diphenylamino-4,6-Bis[4'(4''-Aminophenoxy)anilino]-s-Triazine

To a solution of 60.0g(0.30 mole) of bis(-p-aminophenyl) ether in 250ml of diglyme at 100°C was added dropwise a solution of 15.0g(0.047mole) of 2-diphenylamino-4,6-dichloro-s-triazine. After the addition was complete, the reaction was heated at 100° for 24 hours, cooled and then added to ice-water. The mixture was filtered, washed free of chloride ion with water and dried to give 29.0g(96 percent) of product, m.p. 250°C. Washing the crude with 2-propanol or a recrystallization from dioxanewater did not raise the melting point.
Calculated for
  $C_{39}H_{32}N_8O_2$: C, 72.65; H, 5.00; N, 17.37
  Found: C, 72.76; H, 4.97; N, 1767.

EXAMPLE 8

2-Diphenylamino-4,6-Bis[4'-(4''-Aminobenzyl)anilino]-s-Triazine

A solution of 100g. (0.5mole) of 4,4'-methylenediamine in 1,000ml of dioxane was heated at reflux, and over a 3 hour period, a solution of 31.7g(0.1mole) of 2-diphenyl-amino-4,6-dichloro-s-triazine in 250ml of dioxane was added dropwise thereto. After additional refluxing for 3 hours, the mixture was filtered hot; the filtrate was concentrated to a volume of 600ml. and diluted with 2000ml of isopropanol. After crystallization overnight in the refrigerator, the product was filtered and oven dried; yield 40.6g. (63 percent). Recrystallization from n-butanol yielded 16.5g of the diamine as an off white powder, m.p. 242°–8°c.
Calculated for
  $C_{41}H_{36}N_8$: C, 76.85; H, 5.66; N, 17.49
  Found: C, 76.19; H, 5.74; N, 17.18;
      C, 76.31; H, 5.82; N, 17.31

EXAMPLE 9

2-Diphenylamino-4,6-Bis(4'-Aminoanilino)-s-triazine

A mixture of 317g(1 mole) of 2-diphenylamino-4,6-dichloro-s-triazine, 276g(2moles) of p-nitroaniline and 3,000ml of anisole was heated at reflux for 16 hours under a nitrogen atmosphere. During this period hydrogen chloride was evolved. The reaction mixture was cooled, and the precipitate isolated by filtration. The filter cake was washed successively with methanol, aqueous ammonia, water and again with methanol, then dried at 100°C at a deduced pressure, yielding 474(91 percent Yield) 2-diphenylamino-4,6-bis(4'-nitroanilino)-s-triazine m.p. 334°–6°C as an off-white solid.

Calculated for
$C_{27}H_{20}N_8O_4$: C, 62.30; H, 3.87; N, 21.53
Found: C, 61.92; H, 3.86; N, 21.47;
C, 61.91; H, 3.70; N, 21.49

The dinitro-intermediate above was reduced to the diamine as follows: mixture of 208g(0.4mole) of 2-diphenyl-amino-4,6-bis(p-nitroanilino)-s-triazine, 223(4g-atoms) of iron powder and 2,000ml of dioxane was heated to reflux. Then a paste prepared from 10g of iron powder and hydrochloric acid was added as an activator. Over the course of 45 minutes, 40ml of water was added dropwise to the refluxing reaction mixture. After refluxing for additional 4 hours, the suspension was diluted with 1,000ml of dioxane and 1,000ml of dimethylformamide, heated with charcoal and then cooled in an icebath. The crystalline off-white precipitate was filtered and dried at 50° overnight at 0.1mm Hg yielding 125g (68 percent) of 2-diphenylamino-4,6-bis(4'-aminoanilino)-s-triazine m.p. 238°–40°. This product contains 3/4 mole of solvate-dioxane.
Calculated for
$C_{27}H_{24}N_8 \times 3/4$ dioxane: C, 68.42; H, 5.74; N, 21.28
Found: C, 68.60; H, 5.94; N, 21.74;
C, 68.54; H, 6.03; N, 21.73

Dioxane is retained on further drying at 105°C, 0.1mm Hg.

EXAMPLE 10

2-Diphenylamino-4,6-bis(2'-Aminoanilino)-s-Triazine

In analogy to the procedure above, o-nitroaniline was converted into 2-diphenylamino-4,6-bis(2'-nitroanilino-s-triazine. After recrystallization from ethyl acetate the product was isolated in 78 percent yield, m.p. 242°–243.5°C.
Calculated for
$C_{27}H_{20}N_8O_4$: C; 62.30 H; 3.87 N; 21.53
Found: C; 62.15 H; 3.66 N; 21.65.

Reduction of the dinitro compound (104g, 0.2moles) with iron powder (112g, 2g-atoms) in 500ml of boiling dioxane was carried out by activating with 2 ml of a mixture of iron powder and hydrochloric acid followed by gradual addition of 25ml of water and reflux for 5 hours. To isolate the product the dioxane solution was concentrated and diluted with heptane. Recrystallization from a mixture of 500ml of acetone and 500ml of water yielded 64.9g (71 percent) of white 2-diphenylamino-4,6-bis(2'-aminoanilino)-s-triazine; m.p. 243°–244°C.
Calculated for
$C_{27}H_{27}N_8$: C; 70.42 H; 5.25 N; 24.33
Found: C; 70.39 H; 5.23 N; 23.98

Another sample of the dinitro compound was hydrogenated in dioxane solution at room temperature at 50ps; over 10 percent palladium on charcoal, which produced the above diamine in 90 percent yield.

What is claimed is:

1. A diamino compound having the formula

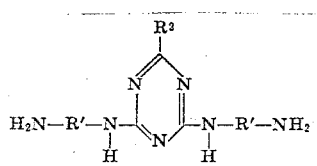

wherein

R' is alkylene of up to eight carbon atoms, cycloalkylene from three to six carbon atoms, arylene, alkarylene, aralkylene, or diarylene ether, diarylene thioether, diarylene methane or diarylene sulfone, said arylene, alkarylene and aralkylene groups having up to 14 carbon atoms, and said arylene alone or in a combined form being a carbocyclic group, and $R^2$ is hydrogen, alkyl of up to eight carbon atoms, cycloalkyl from three to six carbon atoms, phenyl, amino group N-(lower alkyl)amino, (lower) dialkylamino, anilino, diphenylamino, naphthylanilino, pyrrolidino, piperidino, halogen, carboxyl or hydroxyl group.

2. A diamino of claim 1, wherein R' is
   a. ortho, meta, or para phenylene, biphenylene, naphthylene or anthracylene,
   b. the group

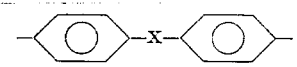

where
   X is sulfur, oxygen, sulfone or methylene, or
   c. cyclopentylene cyclopentyl or cyclohexylene group.

3. The diamine of claim 1 where R' is phenylene.
4. The diamine of claim 1 where $R^2$ is phenyl group.
5. The diamine of claim 1 where $R^2$ is anilino group.
6. The diamine of claim 1 where $R^2$ is diphenylamino group.
7. The diamine of claim 1 where R' is p,p'-diphenylene ether and $R^2$ is phenyl.
8. The diamine of claim 1, which is 2-diphenylamino-4,6-bis(3'-aminoanilino)-s-triazine
9. The diamine of claim 1, which is 2-diphenylamino-4,6-bis(4'-aminoanilino)-s-triazine.
10. The diamine of claim 1, which is 2-diphenylamino-4,6-bis(2'-aminoanilino)-s-triazine.
11. The diamine of claim 1, which is 2,4-bis(3'-aminoanilino)-s-triazine.
12. The diamine of claim 1, which is 2-dimethylamino-4,6-bis(3'-aminoanilino)-s-triazine.
13. The diamine of claim 1, which is 2-amino-4,6-bis(3'-aminoanilino)-s-triazine.
14. The diamine of claim 1, which is 2-phenyl-4,6-bis(3'-aminoanilino)-s-triazine.
15. The diamine of claim 1, which is 2-diphenylamino-4,6-bis[4'-(4''-aminophenoxy)anilino]-s-triazine.
16. The diamine of claim 1, which is 2-diphenylamino-4,6-bis[4'-(4''-aminobenzyl)anilino]-s-triazine.
17. A diamine-dioxane complex wherein said diamine has the formula

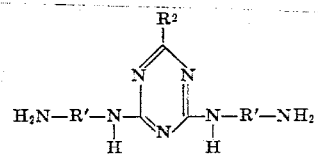

wherein

R² is alkylene of up to eight carbon atoms, cycloalkylene from three to six carbon atoms, arylene, alkarylene, aralkylene, or diarylene ether, diarylene thioether, diarylene methane or diarylene sulfone, said arylene, alkarylene, and aralkylene groups having up to 14 carbon atoms, and said arylene alone or in a combined form being a carbocyclic group, and R² is hydrogen, alkyl of up to eight carbon atosm, cyclo-alkyl from three to six carbon atoms, phenyl, amino group N-(lower alkyl)amino, (lower)dialkylamino, anilino, diphenylamino, naphthylanilino, pyrrolidino, piperidino, halogen, carboxyl or hydroxyl group.

18. The complex of claim 16 wherein the ratio of the diamine to dioxane is 1:1.

19. The complex of claim 16 wherein the ratio of the diamine to dioxane is 1:0.75.

* * * * *